(12) United States Patent
Gardes et al.

(10) Patent No.: US 11,274,633 B2
(45) Date of Patent: Mar. 15, 2022

(54) TURBOFAN COMPRISING A SET OF ROTATABLE BLADES FOR BLOCKING OFF THE BYPASS FLOW DUCT

(71) Applicant: Airbus Operations SAS, Toulouse (FR)

(72) Inventors: Pascal Gardes, Levignac (FR); Bastian Sabathier, Fonsorbes (FR); Antoine Boudou, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 16/839,437

(22) Filed: Apr. 3, 2020

(65) Prior Publication Data

US 2020/0325785 A1 Oct. 15, 2020

(30) Foreign Application Priority Data

Apr. 9, 2019 (FR) ........................... 1903765

(51) Int. Cl.
*F02K 1/72* (2006.01)
*F01D 25/24* (2006.01)

(52) U.S. Cl.
CPC ............... *F02K 1/72* (2013.01); *F01D 25/24* (2013.01); *F05D 2220/323* (2013.01); *F05D 2260/50* (2013.01); *F05D 2260/606* (2013.01)

(58) Field of Classification Search
CPC ... F01D 7/00; F01D 25/24; F02K 1/09; F02K 1/62; F02K 1/625; F02K 1/70; F02K 1/72; F02K 1/763; F05D 2250/411; F05D 2260/50; F05D 2260/606; F05D 2220/323
See application file for complete search history.

(56) References Cited

U.S. PATENT DOCUMENTS

| | | | |
|---|---|---|---|
| 2,933,890 A | 4/1960 | Morrison | |
| 4,030,290 A | 6/1977 | Stachowiak | |
| 2020/0325785 A1* | 10/2020 | Gardes | ................ F01D 25/24 |

OTHER PUBLICATIONS

French Search Report; priority document.

* cited by examiner

*Primary Examiner* — Christopher R Legendre
(74) *Attorney, Agent, or Firm* — Greer, Burns & Crain, Ltd.

(57) ABSTRACT

A turbofan having a nacelle comprising a slider mobile in translation between advanced position and retracted positions to open a window between a duct and the exterior, a plurality of blades, each one being rotatably mobile on the slider between stowed and deployed positions, and a maneuvering system moving each blade and comprising for each blade, a shaft rotatably mobile on the slider and onto which the blade is fixed, for each shaft, a balance beam fixed to the shaft and having first and second ends, for three consecutive balance beams, two connecting rods where the first connecting rod is mounted articulated between the first balance beam and the second balance beam, and where the second connecting rod is mounted articulated between the second balance beam and the third balance beam, and an actuation system rotating one of the connecting rods in one direction and in the other.

3 Claims, 3 Drawing Sheets

TURBOFAN COMPRISING A SET OF ROTATABLE BLADES FOR BLOCKING OFF THE BYPASS FLOW DUCT

CROSS-REFERENCES TO RELATED APPLICATIONS

This application claims the benefit of the French patent application No. 1903765 filed on Apr. 9, 2019, the entire disclosures of which are incorporated herein by way of reference.

FIELD OF THE INVENTION

The present invention relates to a turbofan which comprises a set of blades which are mounted so as to be able to rotate in order to block the duct for the bypass flow, and to an aircraft comprising at least one such turbofan.

BACKGROUND OF THE INVENTION

An aircraft includes a fuselage to each side of which is fixed a wing. Under each wing is suspended at least one turbofan. Each turbofan is fixed under the wing by means of a pylon that is fixed between the structure of the wing and the structure of the turbofan.

The turbofan comprises an engine core and a nacelle that is fixed around the engine core. The turbofan has, between the nacelle and the engine core, a bypass duct in which a bypass flow flows.

The nacelle comprises a plurality of reversal doors, each one being mobile in rotation on the structure of the nacelle, between a stowed position in which it is not in the bypass duct and a deployed position in which it is positioned across the bypass duct in order to redirect the bypass flow towards a window which is in the wall of the nacelle and which is open between the bypass duct and the outside of the nacelle.

Thus, the bypass flow is redirected to the outside and more specifically towards the front of the engine in order to generate reverse thrust. Furthermore, the displacement of each reversal door is performed using a connecting rod which passes through the bypass duct in the stowed position and which therefore partially blocks the bypass duct.

Although reversal doors are entirely satisfactory, it is desirable to find different mechanisms, in particular mechanisms which are more lightweight and which do not present any obstruction to the bypass flow in the stowed position.

SUMMARY OF THE INVENTION

One object of the present invention is to propose a turbofan which comprises a set of blades which are mounted so as to be able to rotate in order to block the duct of the bypass flow.

To that end, a turbofan is proposed having a longitudinal axis and comprising an engine core and a nacelle, surrounding the engine core, which comprises a fan casing, in which a duct for a bypass flow is delimited between the nacelle and the engine core, and in which a flow of air flows in a flow direction, said nacelle comprising:

a fixed structure fixed to the fan casing,
a mobile assembly having a mobile cowl and a slider, the mobile cowl being fixed to the slider, the slider being mobile in translation, on the fixed structure, in a direction of translation between an advanced position in which the slider is positioned such that the mobile cowl is moved close to the fan casing and a retracted position in which the slider is positioned such that the mobile cowl is moved away from the fan casing so as to define, between them, an open window between the duct and the exterior of the nacelle,
a plurality of blades, each one comprising a first end mounted mobile in rotation on the slider about an axis of rotation and where the blades are gradually offset angularly about the longitudinal axis, where each blade is mobile between a stowed position in which the blade is outside the duct and a deployed position in which the blade is across the duct,
an assembly of actuators causing the slider to move between the advanced position and the retracted position, and vice versa, and
a maneuvering system intended to move each blade from the stowed position to the deployed position and vice versa, where the maneuvering system comprises:
for each blade, a shaft mounted mobile in rotation on the slider about an axis of rotation, and onto which the blade is fixed,
for each shaft, a balance beam fixed to the shaft and which has a first end and a second end which are disposed on either side of said shaft,
for a first balance beam, a second balance beam and a third balance beam that are angularly consecutive, two connecting rods where the first connecting rod has two ends, one of which is mounted articulated on the second end of the first balance beam and the other of which is mounted articulated on the second end of the second balance beam, and where the second connecting rod has two ends, one of which is mounted articulated on the first end of the second balance beam and the other of which is mounted articulated on the first end of the third balance beam, and
an actuation system which produces the rotation of one of the connecting rods in one direction and in the other.

An engine of this kind permits a reduction in mass by replacing the reversal doors and their drive mechanisms with more lightweight pivoting blades having a simplified maneuvering system.

Advantageously, the two ends are symmetrical with respect to the axis of rotation.

The invention also proposes an aircraft comprising at least one turbofan in accordance with one of the above variants.

BRIEF DESCRIPTION OF THE DRAWINGS

The abovementioned features of the invention, along with others, will become more clearly apparent on reading the following description of one exemplary embodiment, said description being given with reference to the appended drawings, in which.

DETAILED DESCRIPTION OF THE PREFERRED EMBODIMENTS

In the following description, the terms relating to a position refer to the direction of flow of the air in an engine which therefore flows from the front to the rear of the aircraft.

Figure 1:
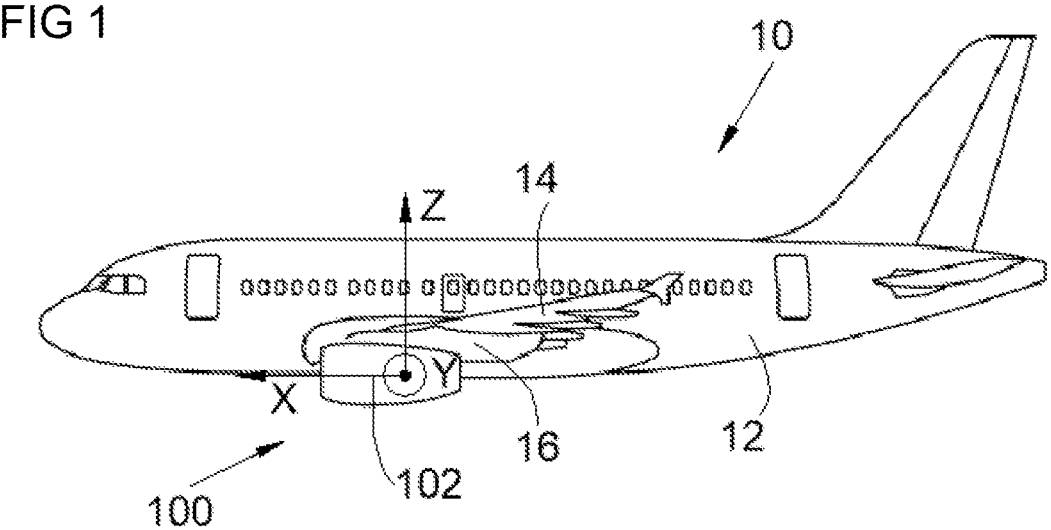
FIG. 1 is a side view of an aircraft comprising a turbofan according to the invention.

FIG. 1 shows an aircraft 10 that comprises a fuselage 12, to each side of which is fixed a wing 14 that bears at least one turbofan 100 according to the invention. The turbofan 100 is fixed under the wing 14 by means of a pylon 16.

Figure 2:
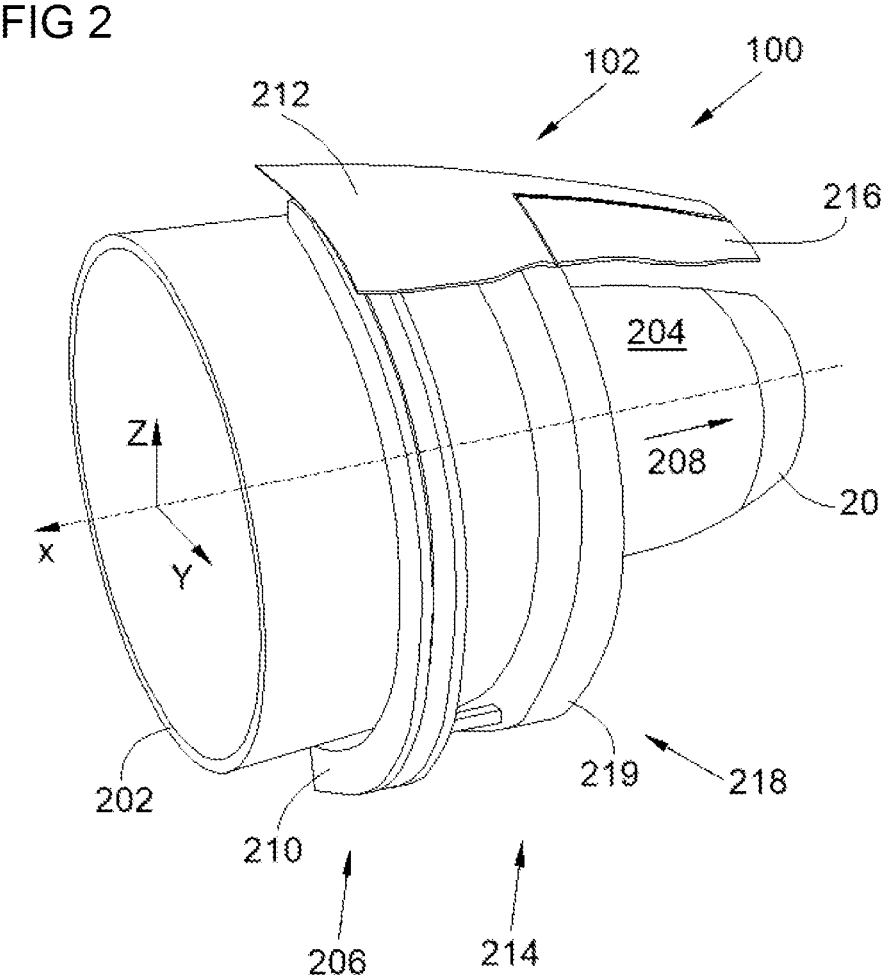
FIG. 2 is a perspective view of the turbofan according to the invention in the advanced and stowed position.
Figure 3:
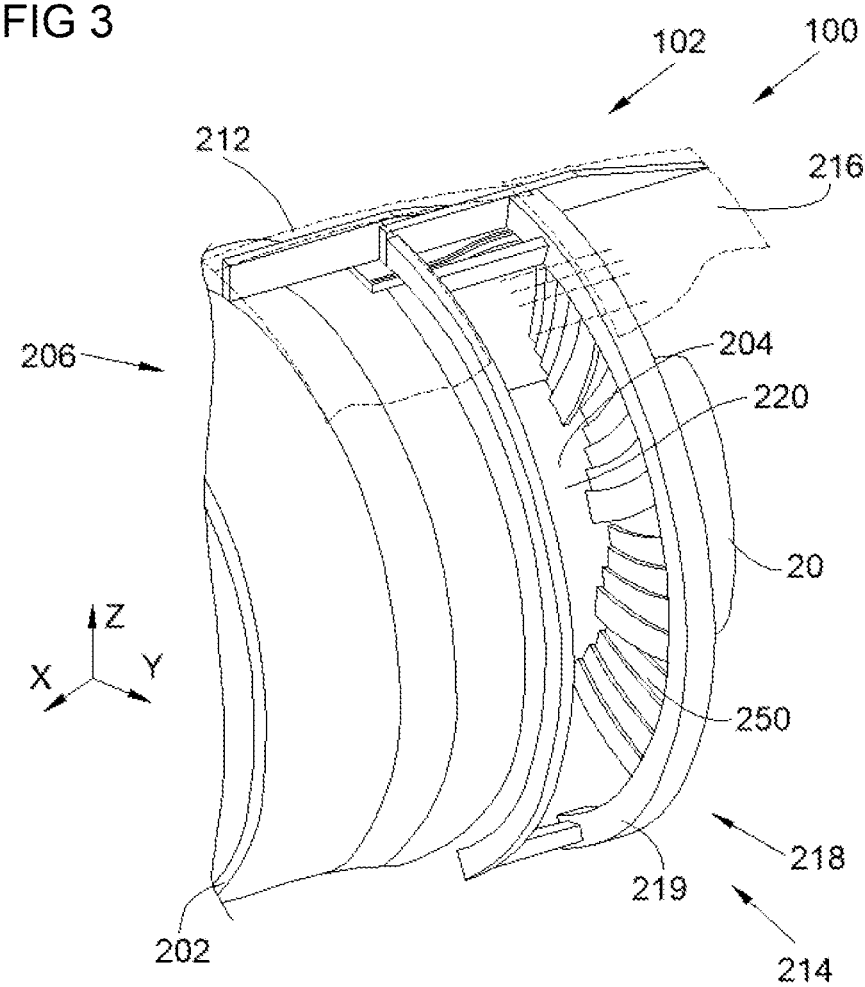
FIG. 3 is a perspective view of the turbofan according to the invention in the retracted and deployed position.

FIG. 2 and FIG. 3 show the turbofan 100 which has a nacelle 102 and a engine core 20 which is housed inside the nacelle 102 and comprises a fan casing 202. The motor 20 is represented by its rear exhaust part.

In the following description, and by convention, X denotes the longitudinal axis of the turbofan 100 that is parallel to the longitudinal axis of the aircraft 10 oriented positively towards the front of the aircraft 10, Y denotes the transverse axis which is horizontal when the aircraft is on the ground, and Z denotes the vertical axis, these three directions X, Y and Z being mutually orthogonal.

Figure 4:
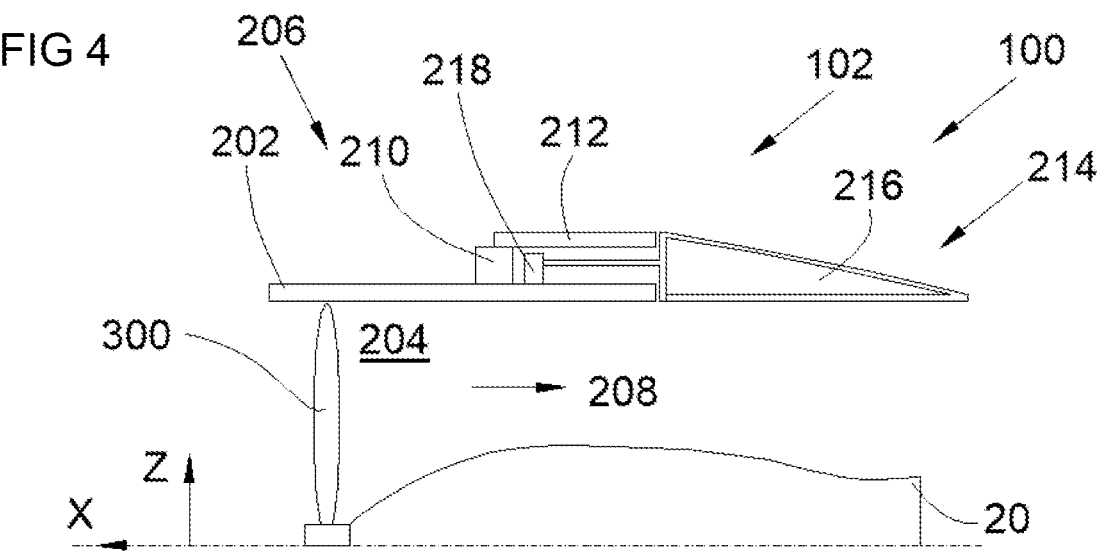
FIG. 4 is a schematic representation of a turbofan according to the invention, viewed in vertical section.

FIG. 2 and FIG. 3 show the turbofan 100 in two different use positions, and FIG. 4 shows a schematic representation in section of the turbofan 100.

The turbofan 100 has, between the nacelle 102 and the engine core 20, a duct 204 in which flows a bypass flow 208 coming from the air intake through a fan 300, and which therefore flows in the flow direction from forward to rear.

The nacelle 102 has a fixed structure 206 that is mounted fixed on the fan casing 202. Here in particular, the fixed structure 206 comprises a front frame 210 mounted around the fan casing 202 and outer panels 212 forming an aerodynamic surface which are shown as transparent in FIG. 3, and of which a portion is cut away in FIGS. 2 and 3.

The nacelle 102 has a mobile assembly 214 which has a mobile cowl 216 (also transparent in FIG. 3) of which a portion is cut away in FIGS. 2 and 3 and which forms the outer walls of the nozzle.

The nacelle 102 also has a slider 218. In this case, the slider 218 is in the form of a cylinder having openwork walls. The mobile cowl 216 is fixed to and downstream of the slider 218 with respect to the direction of flow of the flow of air in the turbofan 100.

The slider 218 is mounted mobile in translation in a translation direction globally parallel to the longitudinal axis X on the fixed structure 206 of the nacelle 102.

The slider 218 is mobile between an advanced position (FIG. 2) and a retracted position (FIG. 3) and vice versa. In the advanced position, the slider 218 is positioned as far forward as possible, with respect to the flow direction, such that the mobile cowl 216 is moved close to the outer panels 212 and to the fan casing 202 and thus forms an aerodynamic surface. In the retracted position, the slider 218 is positioned as far aft as possible, with respect to the flow direction, such that the mobile cowl 216 is moved away from the outer panels 212 and from the fan casing 202 so as to define, between them, a window 220.

In the advanced position, the mobile cowl 216 and the outer panels 212 extend one another so as to define the outer surface of the nacelle 102, and the mobile cowl 216 and the fan casing 202 extend one another so as to define the outer surface of the duct 204.

In the retracted position, the mobile cowl 216 and the fan casing 202, and the outer panels 212, are spaced apart from one another and define, between them, the open window 220 between the duct 204 and the exterior of the nacelle 102. That is to say, the air from the bypass flow 208 passes through the window 220 to end up outside the turbofan 100.

The slider 218 is made to translate by any appropriate means, such as slideways between the fixed structure 206 and the slider 218.

The nacelle 102 also comprises a set of actuators (not shown) that move the slider 218 in translation between the advanced position and the retracted position and vice versa. Each actuator is controlled by a control unit, for example of the processor type, which controls the movements in one direction or the other according to the requirements of the aircraft 10.

Each actuator may, for example, take the form of a double-action jack (two working directions), of which the cylinder is fixed to the fixed structure 206 and a rod is fixed to the slider 218.

In order to orient the flow of air leaving the window 220, cascades can be fixed to the slider 218 facing the window 220.

The fan casing 202 and the outer panels 212 form the upstream boundary of the window 220 with respect to the direction of flow and the mobile cowl 216 forms the downstream boundary of the window 220 with respect to the direction of flow.

The nacelle 102 comprises a plurality of blades 250, each being mounted so as to be able to rotate on the slider 218 about an axis of rotation that is in this case generally parallel to the longitudinal axis X. Thus, each blade 250 is able to move between a stowed position (FIG. 2) in which the blade 250 is outside the duct 204 and a deployed position (FIG. 3) in which the blade 250 is across the duct 204 in order to redirect the bypass flow 208 towards the window 220.

Each blade 250 is mounted so as to be able to move at a first end while a second end moves closer to the engine core 20 when the blade 250 is deployed so as to best block the duct 204.

The blades 250 are gradually offset angularly about the longitudinal axis X.

The number of blades 250, and the shape of each of these, depend on the dimensions of the turbofan 100 and on the width of each blade 250 in order that, in the deployed position, the blades 250 block the majority of the duct 204.

Passage from the stowed position to the deployed position is brought about by rotation of the blade 250 towards the interior of the engine 100.

The stowed position can be adopted when the slider 218 is in the advanced position or the retracted position. The deployed position can be adopted only when the slider 218 is in the retracted position.

The slider 218 also has a maneuvering system 400 which moves each blade 250 from the stowed position to the deployed position.

Thus, operation comprises, starting from the advanced/stowed position, ordering activation of the actuators to move the slider 218 from the advanced position to the retracted position. During or at the end of this movement, the maneuvering system 400 moves the blades 250 from the stowed position to the deployed position.

Conversely, operation thus comprises, starting from the retracted/deployed position, ordering activation of the actuators to move the slider 218 from the retracted position to the advanced position. During or at the start of this movement, the maneuvering system 400 moves the blades 250 from the deployed position to the stowed position.

The use of the blades 250 mounted so as to be able to rotate on the slider 218 makes it possible to lighten the assembly compared to the use of reversal doors of the prior art.

Figure 5:
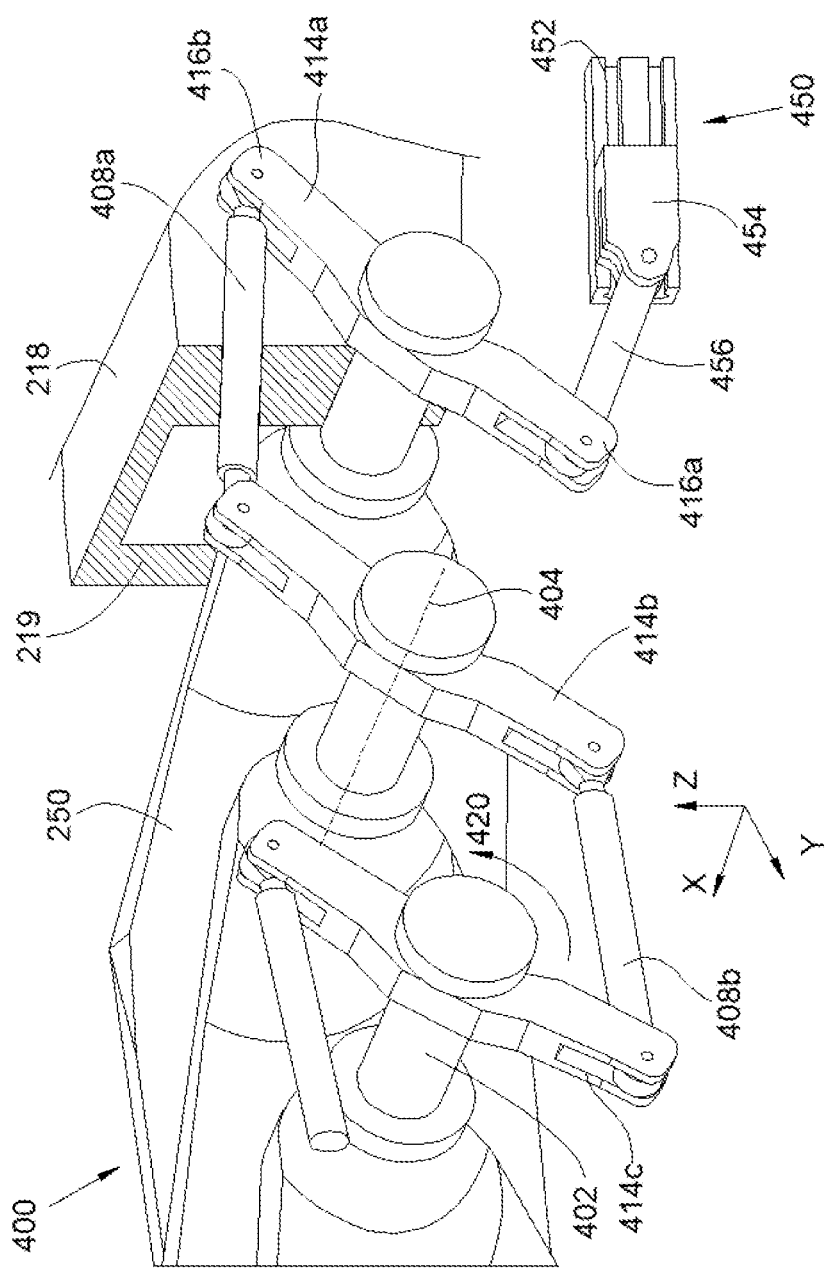
FIG. 5 is a perspective view of a maneuvering system according to the invention.

FIG. 5 shows the maneuvering system 400 which is mounted on the mobile assembly 214 and more particularly on the slider 218.

For each blade 250, the maneuvering system 400 comprises a shaft 402 which is mounted mobile in rotation on the slider 218 about an axis of rotation 404, and onto which the blade 250 is fixed. In FIG. 5, each blade 250 is truncated to simplify the understanding of the mechanism and only three blades 250 are shown in the stowed position. Furthermore, in FIG. 5, the slider 218 is seen in cross section. The axis of rotation 404 is, in this case, generally parallel to the longitudinal axis X.

For each shaft 402, the maneuvering system 400 also comprises a balance beam 414a-c which is fixed to the shaft 402 and comprises two ends 416a-b disposed on either side of said shaft 402. Each balance beam 414a-c is, in this case, in a plane at right angles to the shaft 402.

In the embodiment of the invention presented in FIG. 5, the direction between the two ends is oriented overall radially relative to the longitudinal axis X. That is to say, a first end 416a is disposed between the longitudinal axis X and the axis of rotation 404 and a second end 416b is disposed beyond the axis of rotation 404 relative to the longitudinal axis X. Of course, a different orientation is possible.

The angular offset of the blades 250 causes the angular offset of the shafts 402 and of the balance beams 414a-c. For a first balance beam 414a, a second balance beam 414b and a third balance beam 414c that are angularly consecutive about the longitudinal axis X, the maneuvering system 400 comprises two connecting rods 408a-b where the first connecting rod 408a has two ends, one of which is mounted articulated on the second end 416b of the first balance beam 414a and the other of which is mounted articulated on the second end 416b of the second balance beam 414b, and where the second connecting rod 408b has two ends, one of which is mounted articulated on the first end 416a of the second balance beam 414b and the other of which is mounted articulated on the first end 416a of the third balance beam 414c.

The two connecting rods 408a-b which are fixed onto one and the same shaft 402 are thus offset on either side of the axis of rotation 404 and thus a pull on one of the two connecting rods 408a-b will be converted into a push on the other connecting rod 408b-a.

The operation is then as follows in the case of FIG. 5. When a pulling force is exerted on the connecting rod which is fixed to the first end 416a of the first balance beam 414a, the latter pivots about the axis of rotation 404 in the direction of the arrow 420 and at the same time pushes the connecting rod 408a which is fixed to the second end 416b of the first balance beam 414a, which causes, in cascade-fashion, the rotation of the second balance beam 414b about its axis 404 and in the same direction (420), and so on.

The rotation in the direction of the arrow 420 will cause the displacement of the blades 250 from the stowed position to the deployed position.

Conversely, when a pushing force is exerted on the connecting rod which is fixed to the first end 416a of the first balance beam 414a, the latter pivots about the axis of rotation 404 in the reverse direction of the arrow 420 and at the same time pulls the connecting rod 408a which is fixed to the second end 416b of the first balance beam 414a, which causes, in cascade-fashion, the rotation of the second balance beam 414b about its axis 404 and in the same direction (the reverse of 420), and so on.

The rotation in the reverse direction of the arrow 420 will cause the displacement of the blades 250 from the deployed position to the stowed position.

The maneuvering system 400 also comprises an actuation system 450 which produces the rotational displacement of one of the balance beams 414a-c, here the first balance beam 414a, in one direction and in the other by pulling or by pushing one of the ends of said first balance beam 414a.

In the embodiment of the invention presented in FIG. 5, the actuation system 450 comprises a rail 452 which is mounted fixed on the mobile assembly 214, a trolley 454 mounted sliding on the rail 452 and an actuation connecting rod 456 mounted articulated between the trolley 454 and the first end of the first balance beam 414a.

The actuation system 450 also comprises any appropriate motor means making it possible to ensure the displacement of the trolley 454 along the rail 452, such as, for example, a cylinder mounted articulated between the trolley 454 and the mobile assembly 214, a motor equipped with a rack, etc. The control unit also controls the motor means.

The link between the trolley 454 and the rail 452 in this case takes the form of a double dovetail.

The displacement of each blade 250 is then transmitted step-by-step, and the displacement of one of the balance beams 414a-c will cause the displacement of all of the balance beams 414a-c.

Each articulation between a balance beam 414a-c and a connecting rod 456, 408a-b, takes the form of a cap whose axis of rotation is parallel to the longitudinal axis X.

For a good distribution of the loads, the two ends 416a-b are symmetrical relative to the axis of rotation 404.

The description has been more particularly given in the case of the first ends 416a which are inside relative to the second ends 416b, but it is possible to reverse the positions of the ends and therefore of the connecting rods 408a-b.

Likewise, the description has been more particularly given in the case where the actuation connecting rod 456 is mounted on the first end 416a, but it is possible to mount it on the second end 416b which then becomes a first end and the positions of the connecting rods 408a-b are then reversed relative to FIG. 5.

Each blade 250 extends in a plane that is overall at right angles to the longitudinal axis X.

Each blade 250 is mounted mobile on the perimeter of the slider 218. When the blades 250 are in the stowed position, they are superposed along the longitudinal axis X.

The displacement of all the blades 250 is then relatively simple to implement because it is sufficient to perform a rotation of the arc 408.

In the embodiment of the invention presented in FIG. 5, the slider 218 comprises a U-shaped profile 219 coaxial with the longitudinal axis X and open towards the longitudinal axis X. The U-shaped profile 219 forms a cage in which the blades 250 are mounted mobile in rotation and where the shafts 402 pass through a wall of the U-shaped profile 219.

The invention has been more particularly described in the case of a nacelle under a wing but can be applied to a nacelle located at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan having a longitudinal axis and comprising an engine core and a nacelle, surrounding the engine core, which comprises a fan casing, in which a duct for a bypass flow is delimited between the nacelle and the engine core and in which a flow of air flows in a flow direction, said nacelle comprising:
    a fixed structure fixed to the fan casing,
    a mobile assembly having a mobile cowl and a slider, the mobile cowl being fixed to the slider, the slider being mobile in translation, on the fixed structure, in a direction of translation between an advanced position, in which the slider is positioned such that the mobile cowl is moved close to the fan casing, and a retracted position, in which the slider is positioned such that the mobile cowl is moved away from the fan casing so as to define, between them, an open window between the duct and an exterior of the nacelle,
    a plurality of blades, each blade comprising a first end mounted mobile in rotation on the slider about an axis of rotation and where the blades are gradually offset angularly about the longitudinal axis, where each blade is mobile between a stowed position in which the respective blade is outside the duct and a deployed position in which the respective blade is across the duct,
    an assembly of actuators causing the slider to move between the advanced position and the retracted position, and vice versa, and
    a maneuvering system intended to move each blade from the stowed position to the deployed position and vice versa, where the maneuvering system comprises:
        for each blade, a shaft mounted mobile in rotation on the slider about the axis of rotation, and onto which the blade is fixed,
        for each shaft, a balance beam fixed to the shaft and which has a first end and a second end which are disposed on opposite sides of said shaft,
        for a first balance beam of the balance beams, a second balance beam of the balance beams and a third balance beam of the balance beams that are angularly consecutive, two connecting rods where a first rod of the two connecting rods has two ends, one end of which is mounted articulated on the second end of the first balance beam and the other end of which is mounted articulated on the second end of the second balance beam, and where the second rod of the two connecting rods has two ends, one end of which is mounted articulated on the first end of the second balance beam and the other end of which is mounted articulated on the first end of the third balance beam, and
        an actuation system which produces rotation of one of the balance beams in two directions.

2. The turbofan according to claim 1, wherein, for each of the connecting rods, the two ends are symmetrical with respect to the axis of rotation.

3. An aircraft comprising wings and at least one turbofan having a longitudinal axis and comprising an engine core and a nacelle, surrounding the engine core, which comprises a fan casing, in which a duct for a bypass flow is delimited between the nacelle and the engine core and in which a flow of air flows in a flow direction, said nacelle comprising:
    a fixed structure fixed to the fan casing,
    a mobile assembly having a mobile cowl and a slider, the mobile cowl being fixed to the slider, the slider being mobile in translation, on the fixed structure, in a direction of translation between an advanced position, in which the slider is positioned such that the mobile cowl is moved close to the fan casing, and a retracted position, in which the slider is positioned such that the mobile cowl is moved away from the fan casing so as to define, between them, an open window between the duct and an exterior of the nacelle,
    a plurality of blades, each blade comprising a first end mounted mobile in rotation on the slider about an axis of rotation and where the blades are gradually offset angularly about the longitudinal axis, where each blade is mobile between a stowed position in which the respective blade is outside the duct and a deployed position in which the respective blade is across the duct,
    an assembly of actuators causing the slider to move between the advanced position and the retracted position, and vice versa, and
    a maneuvering system intended to move each blade from the stowed position to the deployed position and vice versa, where the maneuvering system comprises:
        for each blade, a shaft mounted mobile in rotation on the slider about the axis of rotation, and onto which the blade is fixed,
        for each shaft, a balance beam fixed to the shaft and which has a first end and a second end which are disposed on opposite sides of said shaft,
        for a first balance beam of the balance beams, a second balance beam of the balance beams and a third balance beam of the balance beams that are angularly consecutive, two connecting rods where a first rod of the two connecting rods has two ends, one end of which is mounted articulated on the second end of the first balance beam and the other end of which is mounted articulated on the second end of the second balance beam, and where the second rod of the two connecting rods has two ends, one end of which is mounted articulated on the first end of the second balance beam and the other end of which is mounted articulated on the first end of the third balance beam, and
        an actuation system which produces rotation of one of the balance beams in two directions.

* * * * *